United States Patent
Aritomi

(10) Patent No.: US 6,658,156 B1
(45) Date of Patent: Dec. 2, 2003

(54) INFORMATION PROCESSING APPARATUS AND METHOD

(75) Inventor: Masanori Aritomi, Kisarazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/505,729

(22) Filed: Feb. 17, 2000

(30) Foreign Application Priority Data

Feb. 17, 1999 (JP) .......................................... 11-039143
Feb. 8, 2000 (JP) ...................................... 2000-030513

(51) Int. Cl.$^7$ ................................................. G06K 9/36
(52) U.S. Cl. ...................................... 382/239; 382/232
(58) Field of Search ............................... 382/239, 232; 375/240.23; 348/699

(56) References Cited

U.S. PATENT DOCUMENTS 5,253,054 A * 10/1993 Fujiwara et al. ........ 375/240.23
5,588,075 A * 12/1996 Chiba et al. ................. 382/239

* cited by examiner

Primary Examiner—Anh Hong Do

(57) ABSTRACT

Compression processing where block compression is prioritized has various problems, for instance, data compressed by a method other than block compression is compressed at low compression rate, determination of whether or not block compression is possible is time consuming, and when block compression cannot be performed consecutively for a number of blocks, the time required for determination is wasted. In view of this, a left-end block and right-end block having significant data are detected in a series of blocks. With respect to a block between the detected left-end block and right-end block, determination is made as to whether or not block compression is effective. Block compression is performed on the block if block compression is effective, but if block compression is not effective, processing other than block compression is performed on the block and at least a predetermined number of blocks subsequent to said block.

28 Claims, 15 Drawing Sheets

FIG. 5B

| 00 | 01 | 02 | 03 | 04 | 05 | 06 | 07 | 08 |

INFORMATION PROCESSING APPARATUS AND METHOD

FIELD OF THE INVENTION

The present invention relates to an information processing apparatus and method, and more particularly, to an information processing apparatus and method for quickly compressing data such as an image.

BACKGROUND OF THE INVENTION

According to a compression method complying with JPEG (Joint Photographic Experts Group), compression is performed in unit of square blocks each consisting of plural pixels. Hereinafter such compression method will be referred to as "block compression." Depending on the type of block compression, there are conditions or limitations in the block size or size of compressed data. Even if there are no logical conditions or limitations in the block compression, the specification of a decoder may add limitations to the block compression. Therefore, to perform compression with top priority on the block compression (hereinafter referred to as "block compression is prioritized"), original data is read in a specified size and block compression is tested. If the conditions or limitations are fulfilled, the block compression is performed, but if the conditions or limitations are not fulfilled and block compression cannot be performed, block compression is performed by another method, or the block is left uncompressed and processing proceeds to the next block, or data compression is performed by a method other than block compression.

In such case where block compression is prioritized, since another compression method is employed or block compression is skipped for some blocks, the compression rate decreases. Also, the following problems arise.

(1) Determining whether or not block compression is possible is time consuming.

(2) If block compression cannot be performed consecutively for a number of blocks, the time required for determination of block compression is wasted.

(3) Because block compression is prioritized, data portion other than the portion subjected to block compression must be processed in unit of predetermined size (specified block size).

SUMMARY OF THE INVENTION

The present invention is made in consideration of the above situation and has as its object to perform high-speed compression processing without deteriorating compression efficiency.

To achieve the above object, the present invention provides an information processing method comprising the steps of: dividing inputted image data into blocks each having a predetermined pixel size; determining whether or not block compression is effective with respect to at least one of the blocks; performing block compression on the block if it is determined that block compression is effective; and performing processing, other than block compression, on the block and at least a predetermined number of blocks subsequent to said block, if it is determined that block compression is not effective.

Furthermore, to achieve the aforementioned object, the present invention provides an information processing apparatus comprising: division means for dividing inputted image data into blocks each having a predetermined pixel size; determination means for determining whether or not block compression is effective with respect to at least one of the blocks; and processing means for performing block compression on the block if it is determined that block compression is effective, or performing processing, other than block compression, on the block and at least a predetermined number of blocks subsequent to said block if it is determined that block compression is not effective.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A and 5B show brief outlines of compression processing according to the present embodiment;

DESCRIPTION OF THE PREFERRED EMBODIMENTS

Hereinafter, an information processing apparatus as an embodiment of the present invention will be described with reference to accompanying drawings.

Construction

Figure 1:
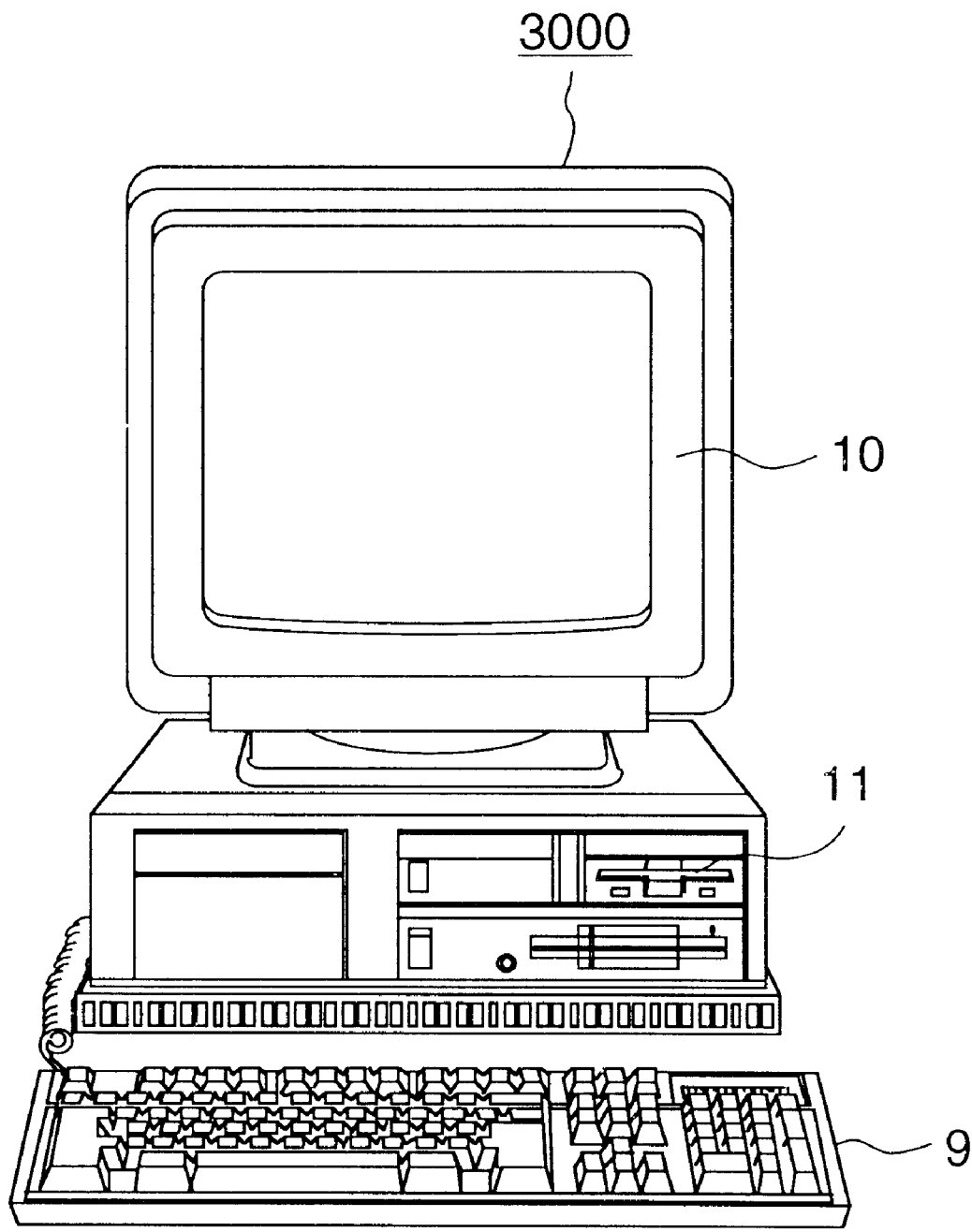
FIG. 1 is an external appearance of an information processing apparatus according to an embodiment of the present invention.

FIG. 1 is an external appearance of an information processing apparatus according to an embodiment of the present invention.

An information processing apparatus 3000, e.g., a personal computer or the like, is preferably used for performing run-length encoding at high speed. The information processing apparatus 3000 comprises a keyboard 9 for receiving user input, and a CRT display 10 for displaying information for a user. The information processing apparatus 3000 also comprises an external memory drive 11 for driving removable storage media storing data or programs, e.g., magnetic disk (floppy disk or hard disk), magneto-optical disk (MO), optical disk (CD-ROM, CD-R, CD-RW), digital video disk (DVD-ROM, DVD-RAM) or the like.

Figure 2:
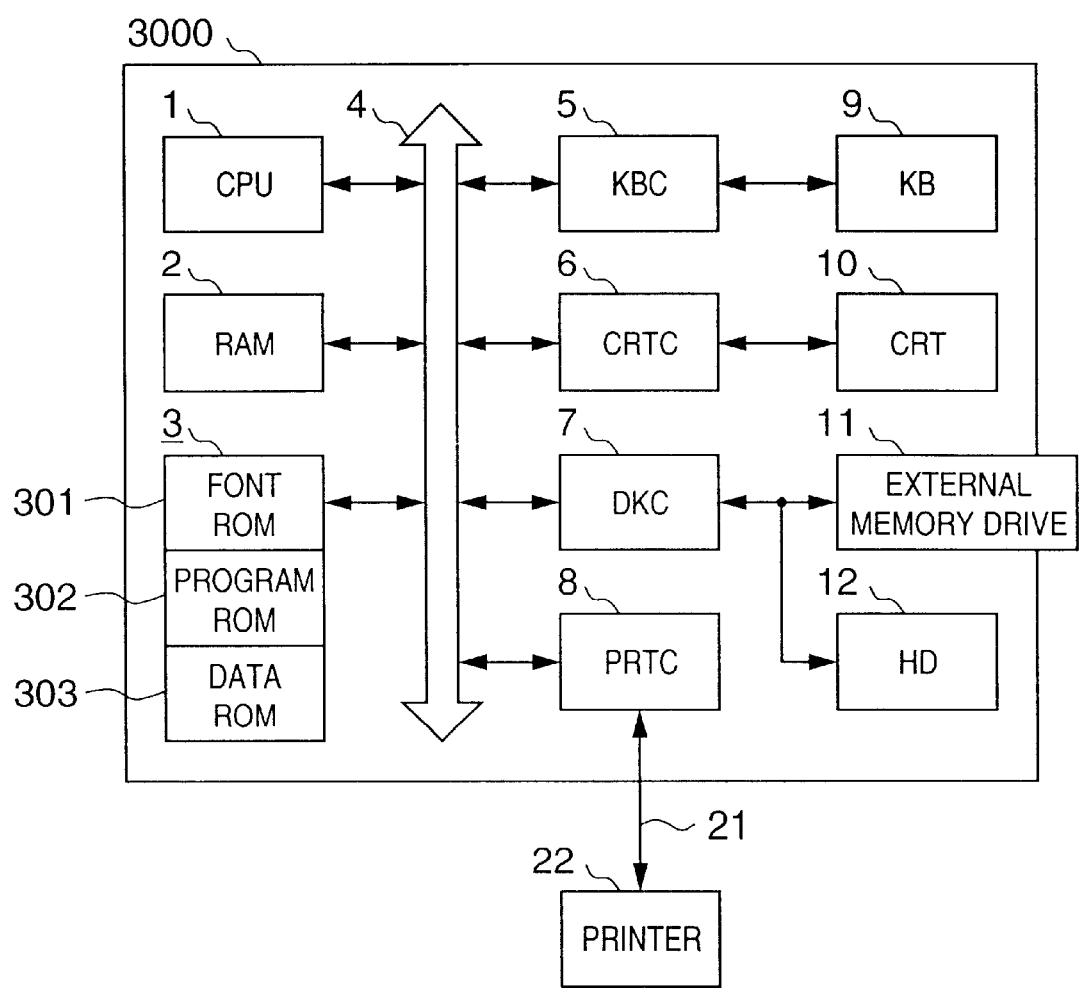
FIG. 2 is a block diagram showing a construction of the information processing apparatus shown in FIG. 1.

FIG. 2 is a block diagram showing a construction of the information processing apparatus 3000.

A CPU 1, serving as a microprocessor, performs processing of a document including drawings, images, characters, tables (including spreadsheet) or the like with the use of work memory of the RAM 2, based on programs or data stored in a program ROM area 302 of ROM 3 or hard disk (HD) 12, and/or a storage medium set in an external memory drive 11. Also, the CPU 1 integrally controls blocks which will be described later via a system device 4.

The program ROM area 302 or a storage medium in the external memory drive 11 stores programs to be executed by the CPU 1 as will be described later with reference to flowcharts. The font ROM area 301 stores font data necessary for generating character patterns to be displayed on the CRT 10 as characters or symbols of document data generated or edited at the time of aforementioned document processing.

The data ROM area 303 stores various data, e.g., directory information of ROM 3, application program tables or the like, used in the aforementioned document processing or display processing.

A keyboard controller (KBC) 5 controls input from the keyboard (KB) 9 and a mouse/pointing device (not shown). A CRT controller (CRTC) 6 controls displaying of the CRT display 10. A disk controller (DKC) 7 controls access to the HD 12 or external memory drive 11, and reads/writes various programs and data such as font data, user files, edited files and so on from/to the storage media. A printer controller (PRTC) 8 is connected to a printer 22 via a predetermined bi-directional interface 21 for controlling communication to the printer 22.

Note that the CPU 1 performs rasterizing processing of outline font data in a display data area allocated in the RAM 2 or in a dedicated video memory (VRAM), thereby enabling WYSIWYG (What You See Is What You Get) operation on the CRT display 10. Furthermore, the CPU 1 executes various data processing by opening registered windows according to a command instructed by a mouse cursor on the CRT display 10.

General Compression Processing

Before providing detailed description of compression processing utilizing the above-described information processing apparatus, general compression processing is described.

Figure 3A:
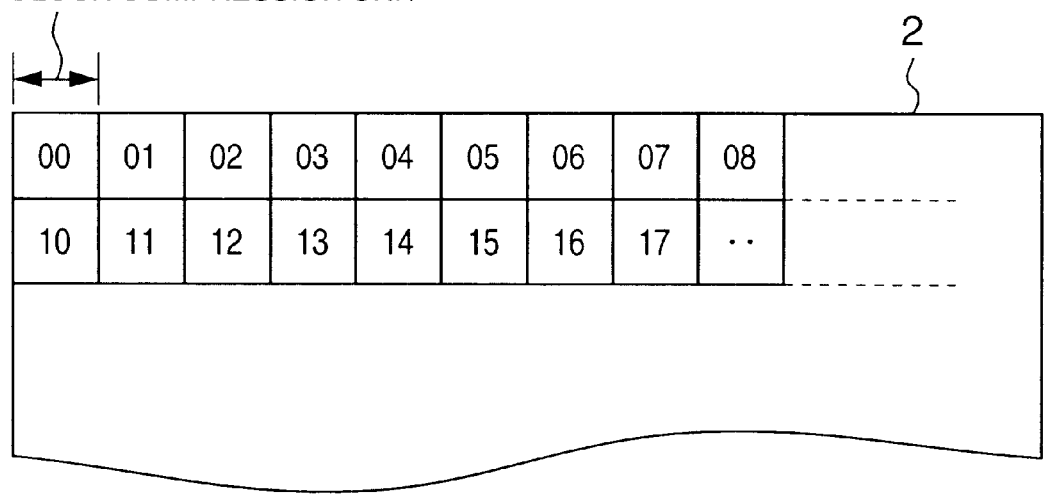
FIG. 3A shows original data subjected to compression.

FIG. 3A shows original data subjected to compression. For explanatory convenience, assume that data in FIG. 3A is image data, and square areas which correspond to blocks in the RAM 2 are numbered from 00. Described hereinafter is an example of compressing image data, written in the RAM 2, with top priority to perform block compression. Note that the data subjected to compression is, for instance, bitmap image data stored in a buffer area allocated in the RAM 2 or consecutive digital data such as a vector pointer list.

In the following description, "block compression" means a compression method where an image needs to be compressed in the pixel-block unit. This includes JPEG or FPX (Flash Pix), where data is logically processed in block unit, or FBE (Fast Boundary Encoding) where data is processed in unit of small areas in accordance with the specification of a decoder.

Furthermore, in the following description, "non-block compression" means a compression method other than the block compression. This includes RLE (Run Length Encoding) exemplified by PackBits or DeltaRow, entropy coding such as Huffman coding, or arithmetic coding or the like. _Non-block compression_ also includes not performing compression.

Still further, in the following description, one or a series of blocks which have been compressed by block compression are referred to as a "block-compression part", and one or a series of blocks which have been compressed by non-block compression are referred to as a "non-block-compression part".

Figure 3B:
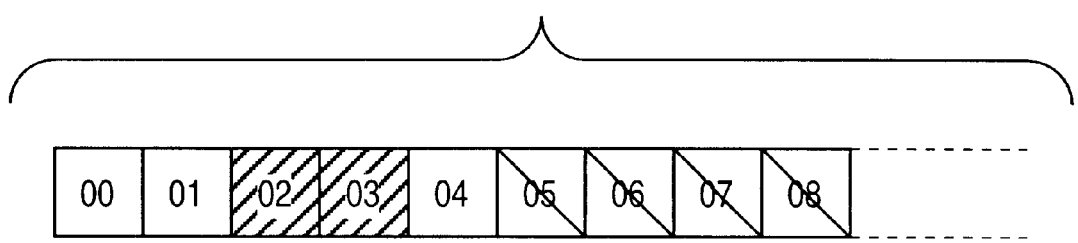
FIG. 3B shows how a compression method is changed in general compression processing, and shows the resultant data.

FIG. 3B shows how the compression method is changed in general compression processing, and shows the resultant data.

First, original data is read from the block 00. Since the block 00 does not have significant data, block 00 is skipped. Blocks 01 and 04 are also skipped. Since blocks 02 and 03 have significant data, block compression is tested. Since the conditions are fulfilled, the blocks 02 and 03 are block-compressed. Next, block 05 having significant data is tested for block compression. However, since the conditions are not fulfilled, the block 05 is not block-compressed. In other words, block 05 is compressed by run length, or not compressed at all. The subsequent blocks 06, 07 and 08 also have significant data, but since they do not fulfill the conditions, these blocks are not block-compressed. As a result, each block is processed as shown in FIG. 3B.

For coding only the blocks having significant data, a flag indicative of significant/not significant is generated for each block as a part of code data for the benefit of decoding. However, since this is not directly related to the embodiment of the present invention, detailed description is not provided.

Furthermore, the block compression is tested by determining whether or not image quality deterioration is within a tolerable range, when the block subjected to compression is block-compressed at a predetermined compression rate, then decompressed, and the decompressed image is compared with the original image. In some block compression methods, block compression is also tested by determining whether or not the block subjected to compression can be compressed to a data size storable in the data buffer of the decoder. As a result of such testing, in a case where it is determined that image quality deterioration is within a tolerable range or that the block can be stored in the data buffer, such case will be expressed as "block compression is possible" or "block compression is effective."

Figure 4:
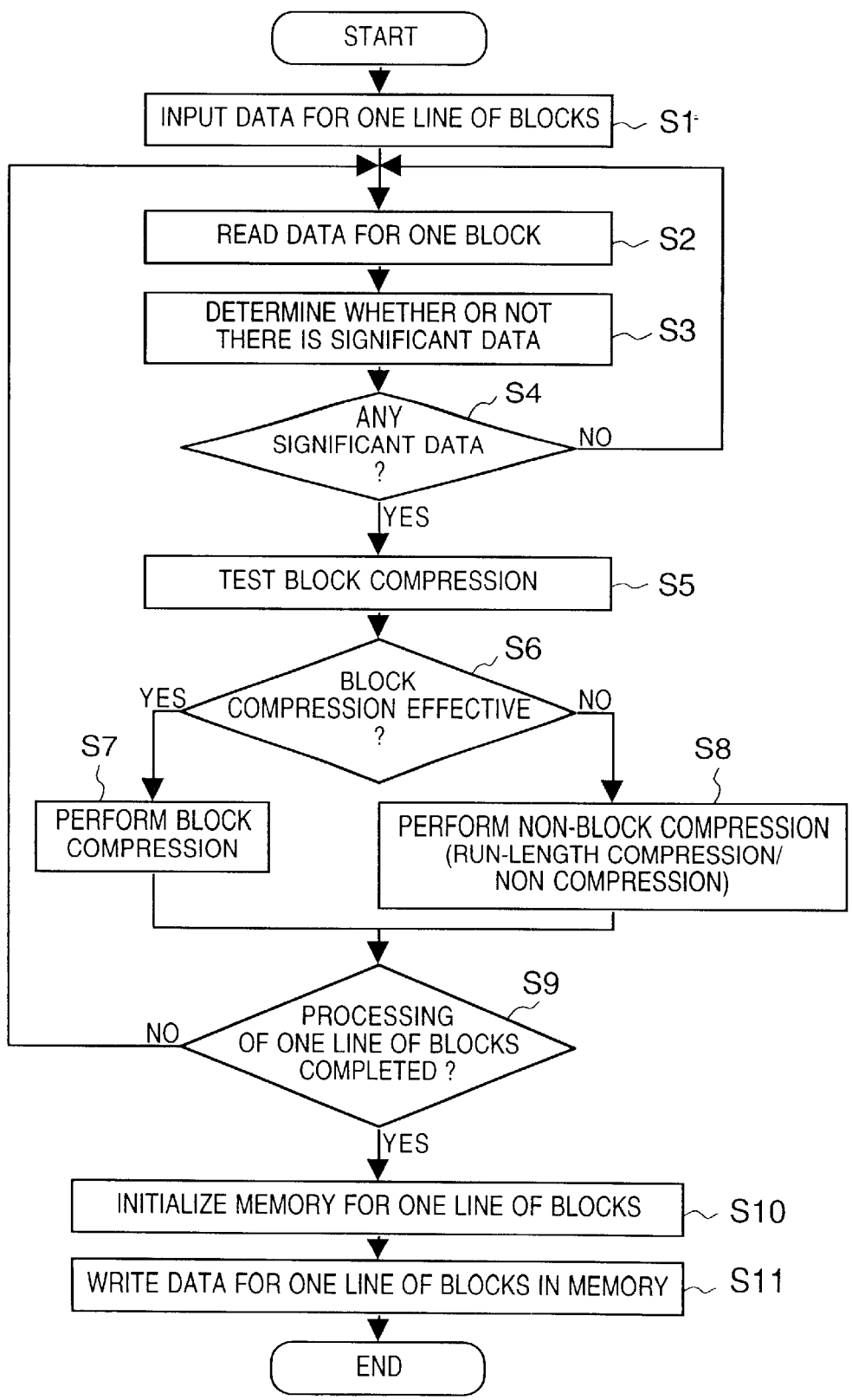
FIG. 4 is a flowchart of compression processing described in FIG. 3B.

FIG. 4 is a flowchart of compression processing described in FIG. 3B.

One line of block data in the Y direction is stored in a predetermined area of RAM 2 (step S1). From the stored data, data of a block of interest is read (step S2) and whether or not the block of interest has significant data is determined (step S3). If YES in step S4, the control proceeds to step S5. If NO in step S4, compression processing of the block of interest is skipped and the control returns to step S2 for reading the next block data.

If the block of interest has significant data, block compression is tested (step S5). If it is determined that block compression is effective (step S6), the block of interest is block-compressed (step S7), but if it is determined that block compression is not effective (step S7), the block is not compressed (step S8).

In step S9, it is determined whether or not the block processing for one line is completed. If not, the control returns to step S2 for reading the next block data and repeating processing of steps S3 to S8. When processing of one line of blocks is completed, memory for one line of blocks is initialized in, for instance, the RAM 2 (step S10), and compressed data is written therein (step S11).

The foregoing processing is performed for each block line until block processing of all data is completed.

As described above, according to the compression processing shown in FIGS. 3B and 4, steps S1 to S11 are repeated for each block line, and steps S2 to S4 are repeated for each block.

Compression Processing According to Embodiment of Present Invention

Figure 5A:
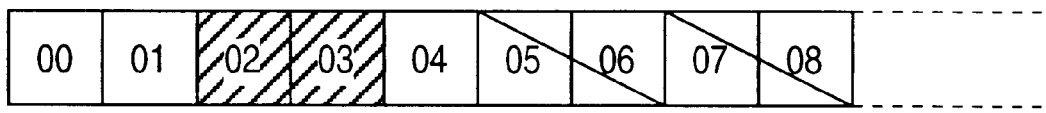

FIG. 5A shows a brief outline of compression processing according to the present embodiment, wherein the non-block-compression part has a fixed two-block size. This processing differs from the general compression method shown in FIG. 3B by the non-compression part 05 to 08.

More specifically, according to the compression processing shown in FIGS. 3B and 4, since the block 05 has significant data, block compression is tested. However, since the conditions are not fulfilled, the block 05 is not block-compressed, but is compressed by RLE or is not compressed at all, and the processing proceeds to the next block 06.

On the other hand, according to the compression processing of the present embodiment shown in FIG. 5A, in a case where the block 05 is determined to be processed by non-block compression, blocks 05 and 06 are regarded as one block, and the square area consisting of blocks 05 and 06 is processed as a non-block-compression part. Then, the processing proceeds to the next block 07.

Therefore, according to the compression processing shown in FIG. 5A, when a block of interest is processed non-block compression, the block subsequent to the block of interest can skip the determination processing of whether or not the block has significant data, which corresponds to steps S3 and S4, and the determination processing of whether or not the block compression is effective, which corresponds to steps S5 and S6. Therefore, the entire compression processing can be performed at high speed.

Even if the subsequent one block does not have significant data, since the block is compressed by RLE or the like, compression efficiency does not greatly deteriorate. Furthermore, in a case of compressing image data, neighboring data of a block of interest is highly likely similar to data of the block of interest. Therefore, when the block of interest is processed by non-block compression, it is highly likely that the subsequent block is processed by non-block compression. From this point of view also, compression efficiency does not greatly deteriorate.

Figure 5B:
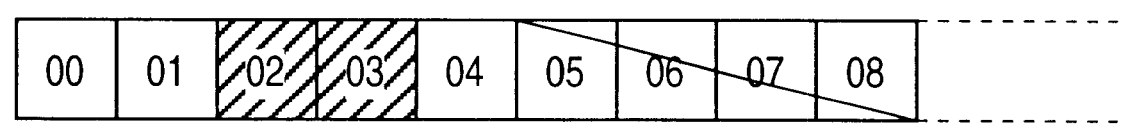

The block size to be processed together as a non-block-compression part is not limited to two blocks, but may be, for instance, three or four blocks. Furthermore, the block size to be processed together as a non-block-compression part does not need to be fixed. FIG. 5B shows a brief outline of compression processing according to the present embodiment, wherein the non-block-compression part has a variable block size.

According to the compression processing of the present embodiment shown in FIG. 5B, when the block 05 is determined to be processed by non-block compression, a predetermined block unit N is skipped and the block determination is continued. Herein, the skipped block unit N is arbitrary, and may be two, three, or four blocks. Until a block different from the block 05 is detected, i.e., until a block not having significant data or a block to be compressed by block compression is detected (details will be described later), block determination is continued while skipping blocks in the predetermined block unit N. FIG. 5B shows an example where blocks 05 to 08 are processed together.

Note that the block unit N to be skipped depends upon characteristics of non-block compression and determination speed. For instance, assuming a case where data having 1 bit/pixel is inputted and one block size in the X direction has 128 pixels, one block has 16 bytes in the X direction. In this case, to perform non-block compression by employing PackBits where the maximum compression run length is 128 bytes, it is efficient to process 8 blocks together since 128/16=8. This serves as a guide to determine the block unit N to be skipped.

Therefore, the compression processing shown in FIG. 5B can eliminate the determination processing of whether or not the block to be skipped has significant data and determination processing of whether or not block compression is effective for the skipping blocks. Thus, the entire compression processing can be performed more quickly than the compression processing shown in FIG. 5A. However, although the time required for determination can be reduced compared to the compression processing shown in FIG. 5A, compression efficiency may deteriorate.

Figure 5C:
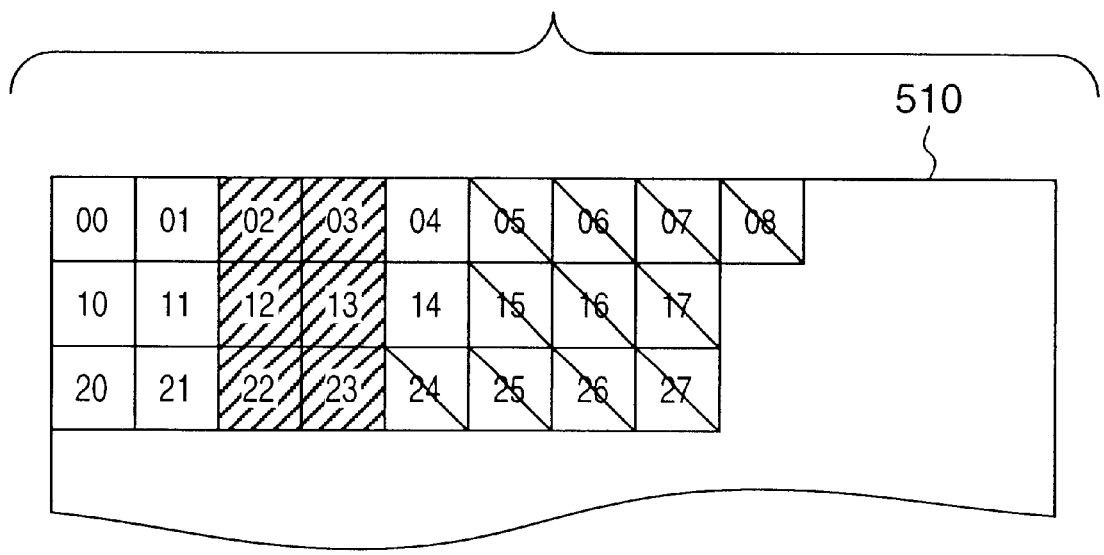
FIG. 5C is a view for explaining difference between general compression processing and the compression processing according to the present embodiment.
Figure 5C:
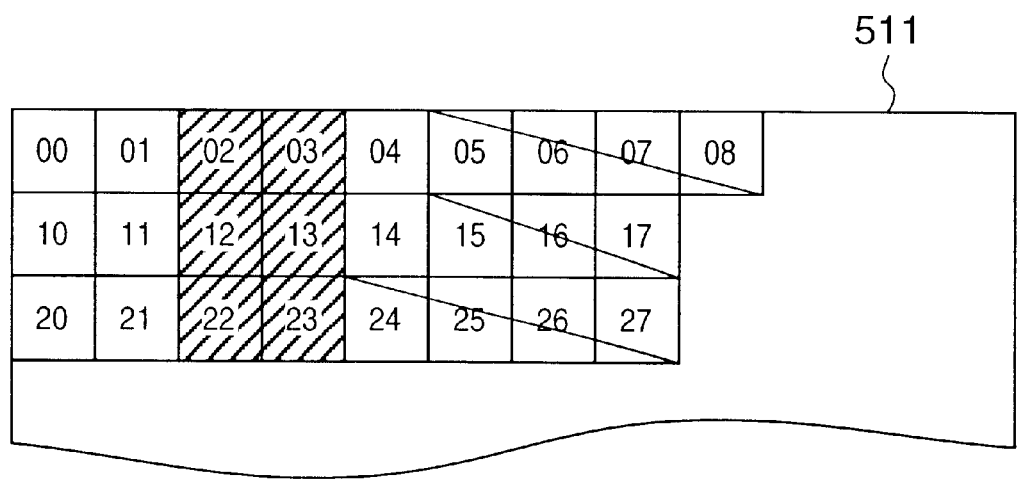
Figure 5C:
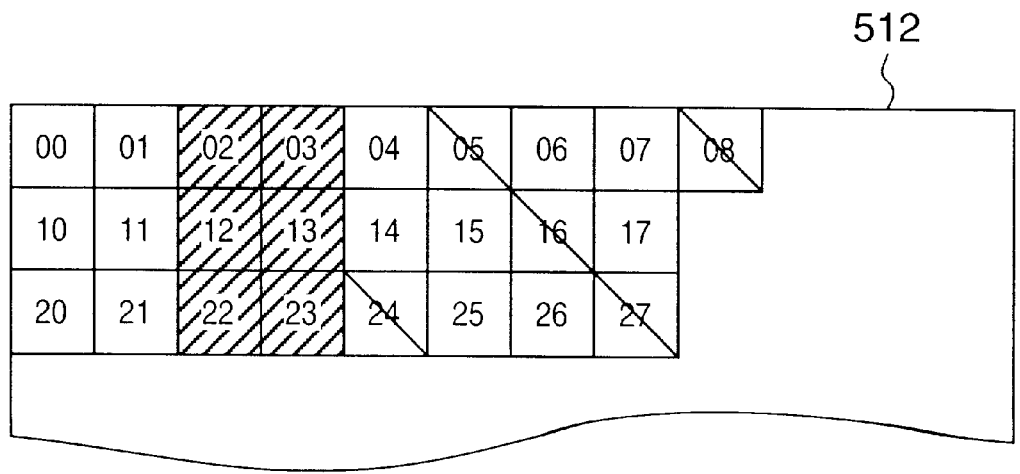

FIG. 5C is a view for explaining difference between general compression processing and the compression processing according to the present embodiment. Reference numeral 510 shows general compression processing and 511 shows the compression processing explained in FIG. 5B.

Further, reference numeral 512 shows processing in which block determination is continued while skipping blocks in a predetermined block unit M in the X and Y directions. The processing indicated by reference numeral 512 is readily realized by copying at least lines of data, corresponding to the skipped block unit M, to a predetermined area of RAM 2 and by accessing the data in the Y direction.

A specific example of the above-described compression processing according to the present embodiment is described. In this example, image data having 1 bit/pixel is processed by FBE (Fast Boundary Encoding) as block compression, and by a combination of non compression and PackBits as non-block compression.

An FBE decoder has two limitations: decoding (expansion) is performed in block unit of 128×128 pixels; and a buffer size for decoding is 128/8×128=2K bytes. According to PackBits, generally data is compressible to the run length of 128 bytes. The block unit N to be skipped in non-block compression is set to 8. Since the block size of FBE in the X direction is 128 pixels (=16 bytes) and the run length of PackBits is 128 bytes, it is efficient to set the skipping block unit in 128/16=8 blocks.

When compression of image data having 1 bit/pixel is started, FBE is tested in block unit of 128×128 pixels. If the data size of a block A after compression is within 2K bytes, the block is compressed by FBE. If the data size of the block A after compression is equal to or larger than 2K bytes, blocks A to A+7 are processed together as one block and compressed by PackBits. Then, the processing proceeds to the next block A+8. In other words, with regard to the 7 blocks, determination of whether or not the block to be skipped has significant data (corresponding to steps S3 and S4) and determination of whether or not block compression is effective (corresponding to steps S5 and S6) can be eliminated. Therefore, compression processing can be performed at high speed.

As mentioned above, even if blocks A+1 to A+7 do not have significant data, since the run length is compressed by PackBits, compression efficiency does not deteriorate greatly. Furthermore, normally, neighboring data of a block of interest is highly likely similar to the data of the block of interest. Therefore, in a case where the block of interest is processed by PackBits, it is likely that neighboring data of the block of interest is processed by PackBits. Thus, compression efficiency does not greatly deteriorate.

Note that although the block unit N to be skipped, i.e., block size of PackBits, is set to 8, N may be set to 4 or 2, or may be set variable. Note that since PackBits has a characteristic of high compression efficiency in the main-scan direction X, it is not efficient to skip blocks in the sub-scan direction Y. Meanwhile, in a case of employing a method, such as DeltaRow, having a characteristic of high compression efficiency in the sub-scan direction Y, blocks should be skipped in the sub-scan direction Y also.

According to the above-described compression processing, in a case of performing compression with block compression priority, image data can be compressed while quickly switching plural compression methods.

Compression Processing Steps

Figure 6A:
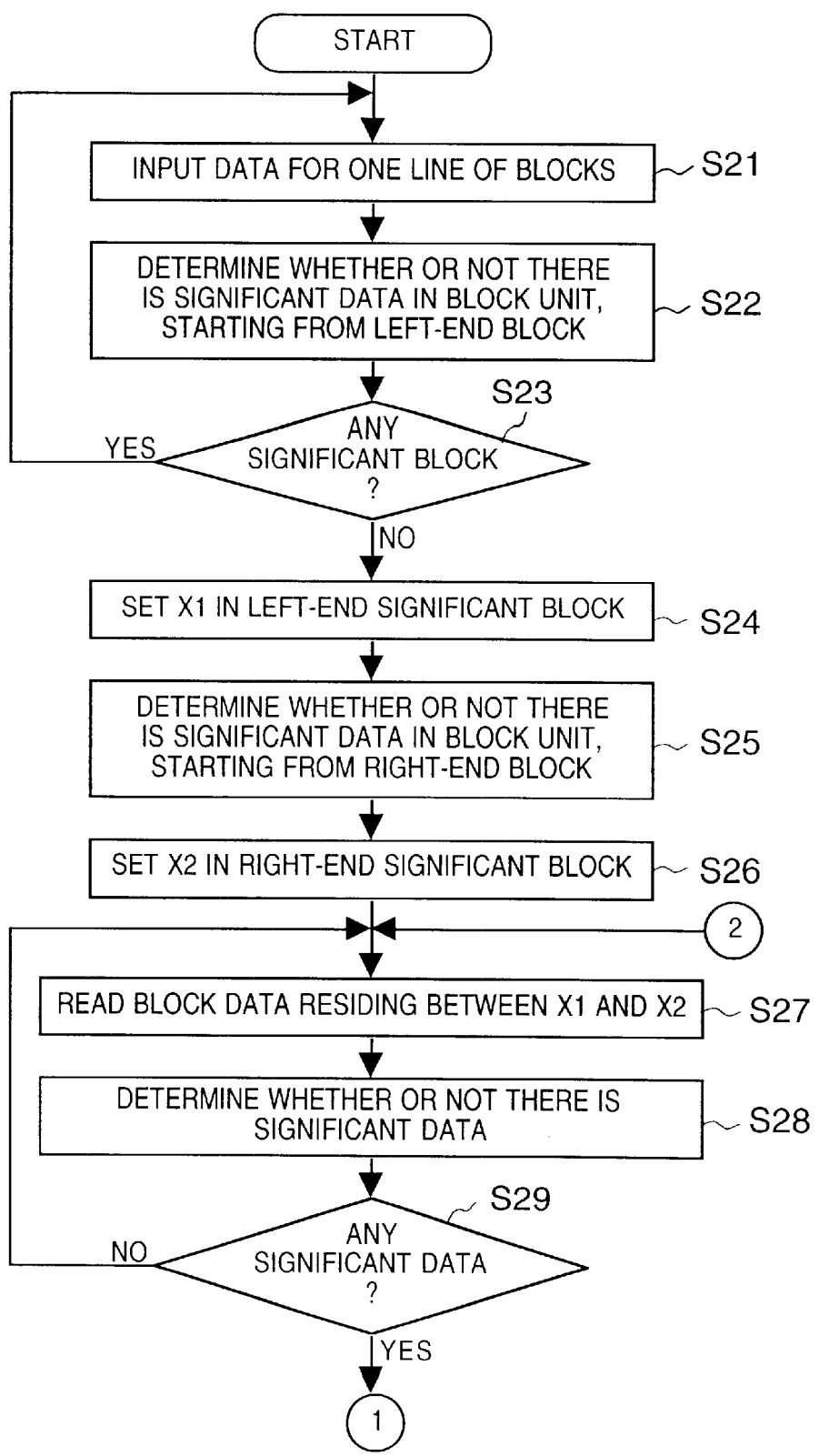
FIGS. 6A and 6B are flowcharts of compression processing described in FIG. 5A.
Figure 6B:
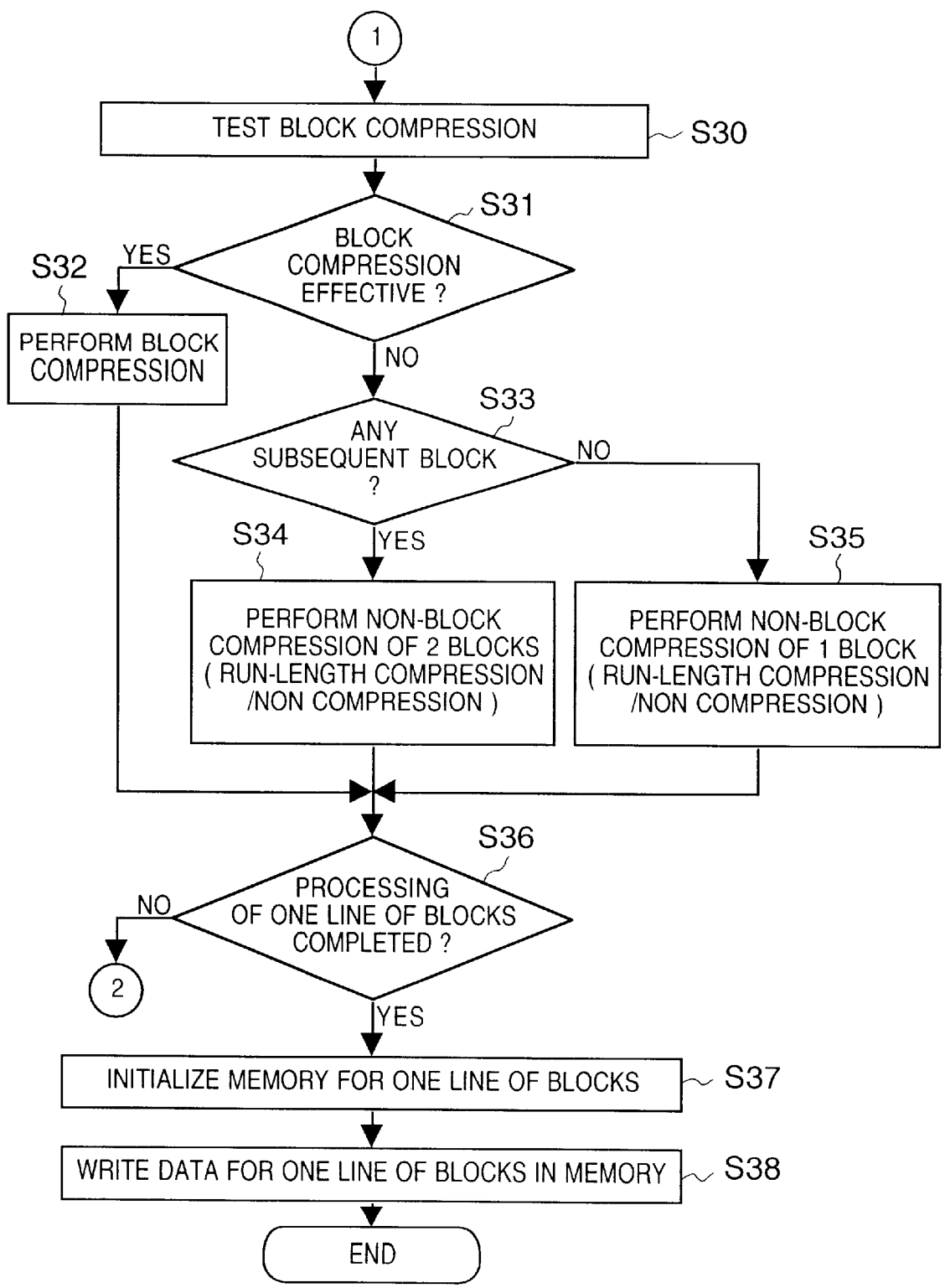

FIGS. 6A and 6B are flowcharts of compression processing described in FIG. 5A.

One line of block data in the Y direction is stored in a predetermined area of RAM 2 (step S21). Then, whether or not a block has significant data is determined in block unit, starting from the left-end block in the X direction (steps S22 and S23). If a block having significant data is not found until determination reaches the right-end block, the control returns to step S21 and read the block data of the next line.

Meanwhile, when a block having significant data is found (hereinafter referred to as a significant block), X1 is set in the block (step S24). Next, starting from the right-end block, whether or not a block has significant data is determined in block unit (step S25), and X2 is set when significant block is found (step S26).

Next, data is read from the block of interest residing between X1 and X2 (step S27), and whether or not the block of interest has significant data is determined (step S28). If YES in step S29, the control proceeds to step S30. If NO in step S29, the control returns to step S27 for reading the next block data, and compression of the block of interest is skipped.

If the block of interest has significant data in step S29, block compression is tested (step S30). If it is determined that block compression is effective (step S31), the block of interest is compressed by block compression (step S32), whereas if it is determined that block compression is not effective, then it is determined whether or not there is a block subsequent to the block of interest (step S33). If there is a subsequent block, the block of interest and the subsequent block are compressed by non-block compression (step S34). If there is no subsequent block, only the block of interest is compressed by non-block compression (step S35).

When the above processing is completed, it is determined in step S36 whether or not processing of one line of blocks is completed. If not, the control returns to step S27 for reading the next block data and repeating the processing of steps S28 to S35. When processing of one line of blocks is completed, memory for one line of blocks is initialized in, for instance, the RAM 2, and compressed data is written therein (step S38).

The above processing is performed in unit of block line until processing of all blocks are completed.

Figure 7A:
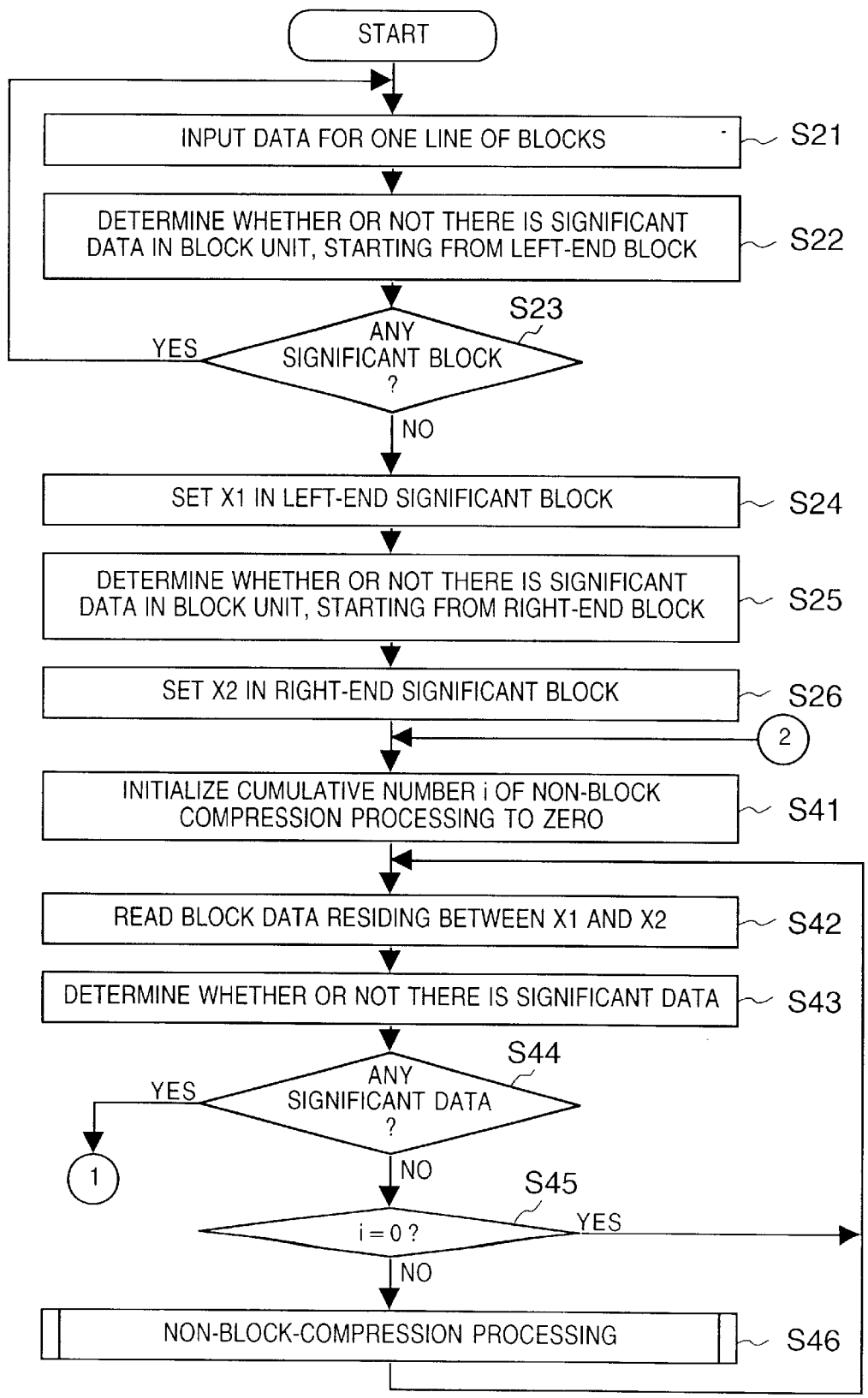
FIGS. 7A to 7C are flowcharts of compression processing described in FIG. 5B.
Figure 7B:
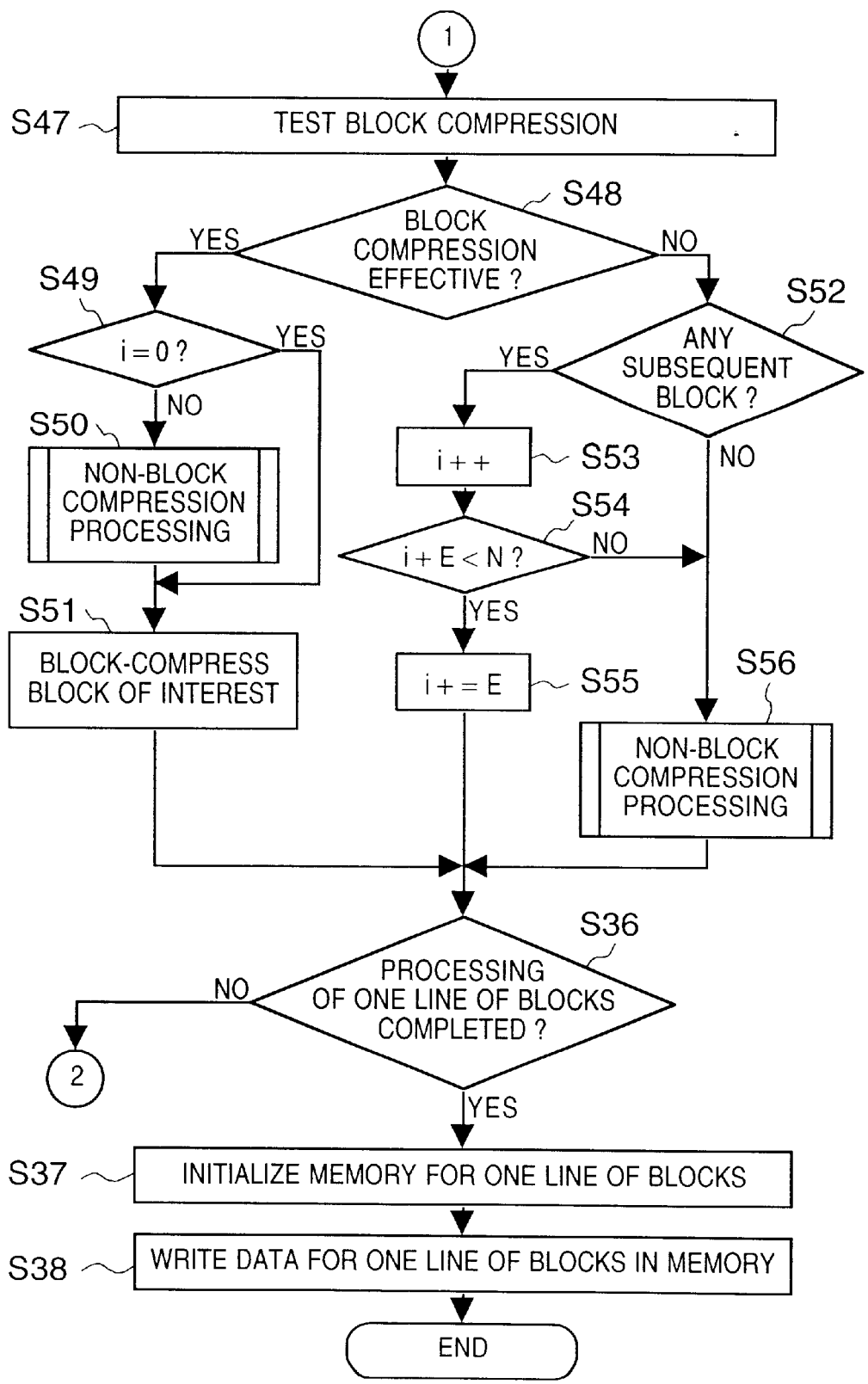
Figure 7C:
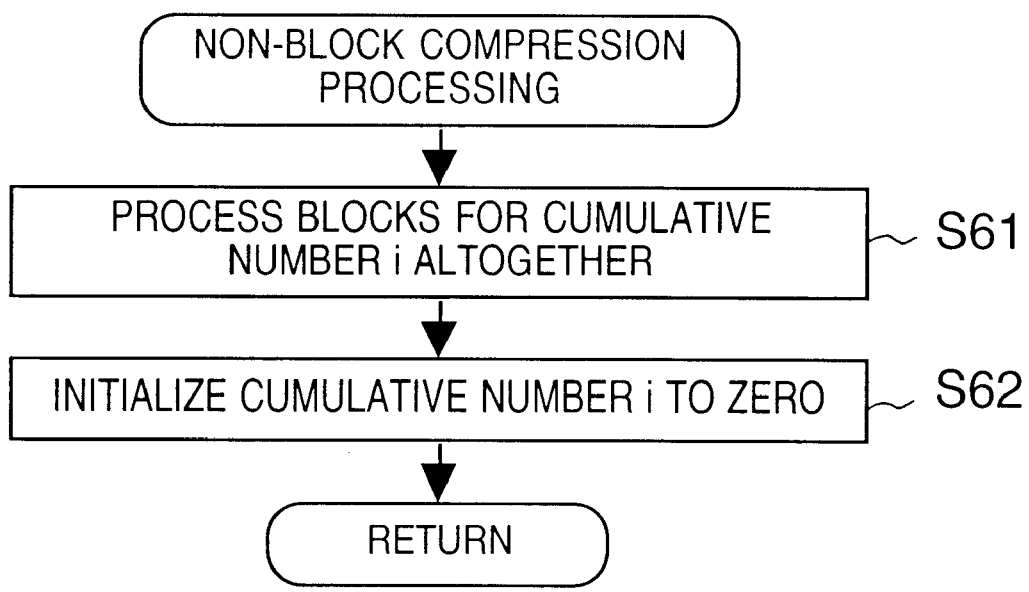

FIGS. 7A to 7C are flowcharts of compression processing described in FIG. 5B. Note that for the same processing as those shown in FIGS. 6A and 6B, the same step numbers are assigned and detailed description thereof is omitted.

When the above-described processing of steps S21 to S26 is completed, a cumulative number i of non-block compression is initialized to 0 (step S41). Then, data is read from the block of interest residing between X1 and X2 (step S42), and whether or not the block of interest has significant data is determined (step S43). If the block of interest has significant data, the control proceeds to step S47.

If the block of interest does not have significant data, the control proceeds to step S45 where it is determined whether or not the cumulative number i is 0. If i>0, it means that blocks to be non-block-compressed are accumulated. Thus, these accumulated blocks are compressed by non-block compression in step S46. Then, the control returns to step S42 for reading the next block data, and compression of the block of interest is skipped.

If the block of interest has significant data, block compression is tested (step S47). If it is determined that block compression is effective (step S48), it is determined in step S49 whether or not the cumulative number i is 0. If i>0, it means that blocks to be non-block-compressed are accumulated. Thus, these accumulated blocks are compressed by non-block compression in step S50. Then, the block of interest is compressed by block compression (step S51).

Meanwhile, if it is determined that block compression is not effective, then it is determined whether or not there is a block subsequent to the block of interest (step S52). If YES, the cumulative number i is incremented (step S53). Then it is determined whether or not i+E (skipped block number) is less than the cumulative number limitation N (step S54). If i+E<N, the skipping number E is added to the cumulative number i (step S55). If there is no subsequent block or if i+E≧N, the accumulated blocks are compressed by non-block compression in step S56.

FIG. 7C is a flowchart showing non-block compression processing. In step S61, blocks for the cumulative number i are processed altogether, then in step S62, the cumulative number i is initialized to 0, and the control returns to main routine.

In the foregoing embodiment, the arrangement of each routine may be modified. For instance, sub routines may be executed in parallel, or sub routines may be executed sequentially within a routine, or a sub routine of lower hierarchy may be looped in a sub routine of higher hierarchy.

Furthermore, the present invention is applicable not only to a case of performing a combination of block compression, non-block compression other than block compression, and non compression, but also to a case of processing original data of unknown contents by employing plural compression methods which require different area conditions, i.e., a case of employing plural block compression methods, or to a case of employing plural non-block compression methods.

Figure 8:
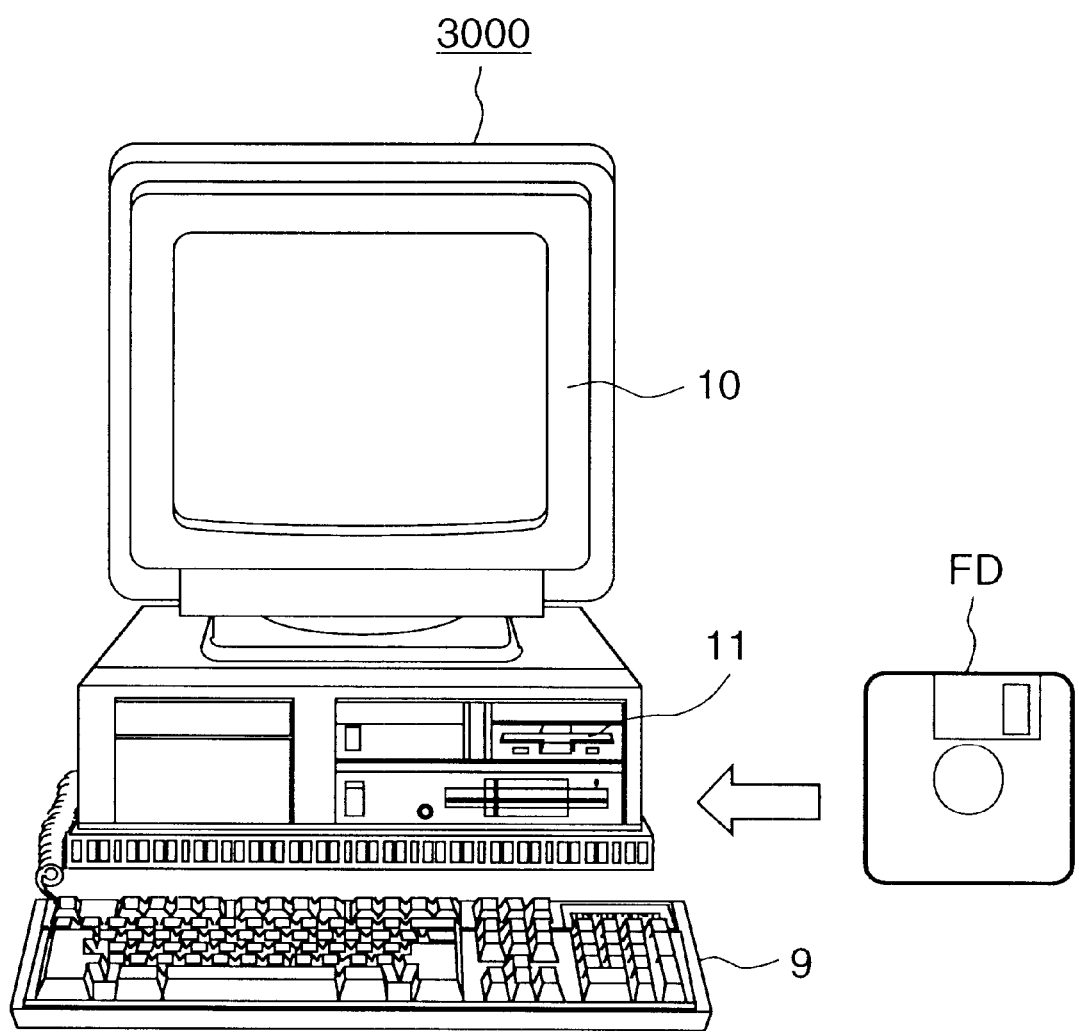
FIG. 8 shows how a program stored in a storage medium is loaded to the information processing apparatus shown in FIG. 1 serving as a host computer.
Figure 9:
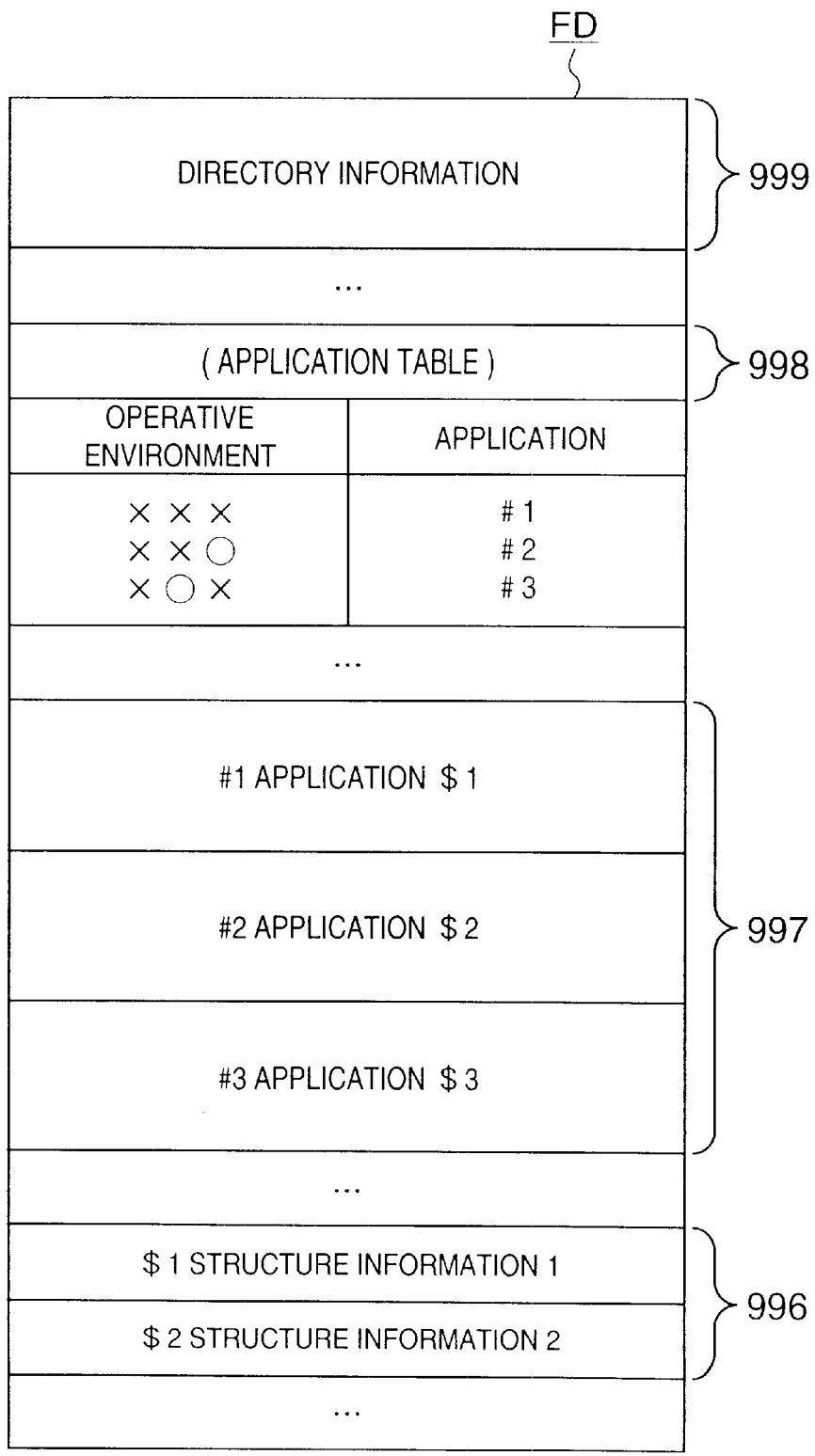
FIG. 9 is a memory map of a floppy disk (FD) as an example of a storage medium.

FIG. 8 shows how a program stored in a floppy disk (FD) is loaded to the information processing apparatus 3000 shown in FIG. 1, which serves as a host computer. FIG. 9 is a memory map of FD as an example of a storage medium.

Referring to FIG. 9, reference numeral 999 denotes an area storing directory information which indicates where the application program table 998 is stored. Further, the memory map in FIG. 9 shows a storage area 997 where control programs shown in FIGS. 4, 6A, 6B and 7A–7C are stored, and a storage area 996 where structure information for processing or the like is stored.

When an operator of the host computer designates with the KB 9, for instance, a name of application program to be installed from the FD, the application program is loaded to the host computer by referring to the aforementioned table 998. For instance, when an operation environment XXX is instructed, a corresponding application program and structure information are loaded from the area 997 and 996 to the host computer.

As has been described above, according to the foregoing embodiment, the following effects can be achieved in compression processing where block compression is prioritized.

(1) The process of determining whether or not block compression is effective is reduced.

(2) Time required for determination can be reduced since blocks which cannot be compressed by block compression do not consecutively appear.

(3) The processing unit of non-block compression can be made variable.

In other words, the number of times of determining whether or not block compression is effective can be reduced. In addition, in a case where there are consecutive blocks which cannot be processed by block compression, determination for these blocks can be eliminated. Furthermore, the processing unit of non-block compression can be changed. Moreover, compression efficiency of the non-block-compression part can be improved. Accordingly, the above-described embodiment can achieve efficient and high-speed compression processing with top priority on block compression, and can efficiently execute data compression and image processing.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

The present invention is not limited to the above embodiments and various changes and modifications can be made within the spirit and scope of the present invention. Therefore, to apprise the public of the scope of the present invention, the following claims are made.

What is claimed is:

1. An information processing method comprising the steps of:

dividing inputted image data into blocks each having a predetermined pixel size;

determining whether or not block compression is effective with respect to at least one of the blocks;

performing block compression on the block if it is determined that block compression is effective; and performing processing, other than block compression, on the block and at least a predetermined number of blocks subsequent to the block, if it is determined that block compression is not effective, wherein said determining step is conducted in a predetermined sequence for a plurality of blocks, and is skipped for at least a predetermined number of blocks subsequent to a block for which it is determined the block compression is not effective.

2. The method according to claim 1, wherein said determining step includes determining whether or not block compression is effective by a compression rate of block data.

3. The method according to claim 1, wherein the processing other than block compression includes at least Run Length Encoding (RLE) or non-compression processing.

4. The method according to claim 1, wherein the processing other than block compression is compression processing employing PackBits.

5. The method according to claim 1, wherein the processing other than block compression is compression processing employing DeltaRow.

6. The method according to claim 1, wherein the data is image data.

7. An information processing method comprising the steps of:

reading data out of memory in a predetermined unit;

dividing the data into a series of blocks each having a predetermined size;

detecting a left-end block and a right-end block, each having significant data, in the series of blocks;

determining whether or not block compression is effective with respect to a block existing between the detected left-end block and right-end block;

performing block compression on the block if it is determined that block compression is effective; and performing processing, other than block compression, on the block and at least a predetermined number of blocks subsequent to the block, if it is determined that block compression is not effective, wherein said determining step is conducted in a predetermined sequence for a plurality of blocks, and is skipped for at least a predetermined number of blocks subsequent to a block for which it is determined that block compression is not effective.

8. The method according to claim 7, wherein said determining step includes determining whether or not block compression is effective by a compression rate of block data.

9. The method according to claim 7, wherein the processing other than block compression includes at least Run Length Encoding (RLE) or non-compression processing.

10. The method according to claim 7, wherein the processing other than block compression is compression processing employing PackBits.

11. The method according to claim 7, wherein the processing other than block compression is compression processing employing DeltaRow.

12. The method according to claim 7, wherein the data is image data.

13. The method according to claim 7, wherein said detecting step further includes the steps of searching for first significant data starting in order from a first block at an end of the series of blocks, and, when the first significant data is detected, searching for second significant data starting in order from a second block at an end of the series of blocks opposite to the end having the first block.

14. An information processing apparatus comprising:
   division means for dividing inputted image data into blocks each having a predetermined pixel size;
   determination means for determining whether or not block compression is effective with respect to at least one of the blocks; and
   processing means for performing block compression on the block if it is determined that block compression is effective, or performing processing, other than block compression, on the block and at least a predetermined number of blocks subsequent to said block, if it is determined that block compression is not effective,
   wherein said determining means operates in a predetermined sequence on a plurality of blocks, and skips operation for at least a predetermined number of blocks subsequent to a block for which it is determined that block compression is not effective.

15. The apparatus according to claim 14, wherein whether or not block compression is effective is determined by a compression rate of block data.

16. The apparatus according to claim 14, wherein the processing other than block compression includes at least Run Length Encoding (RLE) or non-compression processing.

17. The apparatus according to claim 14, wherein the processing other than block compression is compression processing employing PackBits.

18. The apparatus according to claim 14, wherein the processing other than block compression is compression processing employing DeltaRow.

19. The apparatus according to claim 14, wherein the data is image data.

20. An information processing apparatus comprising:
   detection means for dividing data, read out of memory in a predetermined unit, into a series of blocks each having a predetermined size, and detecting a left-end block and a right-end block having significant data in the series of blocks;
   determination means for determining whether or not block compression is effective with respect to a block existing between the detected left-end block and right-end block; and
   processing means for performing block compression on the block if it is determined that block compression is effective, or performing processing, other than block compression, on the block and at least a predetermined number of blocks subsequent to the block, if it is determined that block compression is not effective,
   wherein said determining means operates in a predetermined sequence for a plurality of blocks, and skips operation for at least a predetermined number of blocks subsequent to a block for which it is determined that block compression is not effective.

21. The apparatus according to claim 20, wherein whether or not block compression is effective is determined by a compression rate of block data.

22. The apparatus according to claim 20, wherein the processing other than block compression includes at least Run Length Encoding (RLE) or non-compression processing.

23. The apparatus according to claim 20, wherein the processing other than block compression is compression processing employing PackBits.

24. The apparatus according to claim 20, wherein the processing other than block compression is compression processing employing DeltaRow.

25. The apparatus according to claim 20, wherein the data is image data.

26. The apparatus according to claim 19, wherein the detecting means searches for first significant data starting in order from a first block at an end of the series of blocks, and, when the first significant data is detected, searches for second significant data starting in order from a second block at an end of the series of blocks opposite to the end having the first block.

27. A computer program product comprising a computer readable medium having computer program code for an information processing method, said product comprising:
   dividing process procedure code, for dividing inputted image data into blocks each having a predetermined pixel size;
   determining process procedure code, for determining whether or not block compression is effective with respect to at least one of the blocks;
   compressing process procedure code, for performing block compression on the block if it is determined that block compression is effective; and
   processing process procedure code, for performing processing, other than block compression, on the block and at least a predetermined number of blocks subsequent to the block, if it is determined that block compression is not effective,
   wherein the determining process procedure code is executed in a predetermined sequence for a plurality of blocks, and determining is skipped for at least a predetermined number of blocks subsequent to a block for which it is determined that block compression is not effective.

28. A computer program product comprising a computer readable medium having computer program code for an information processing method, said product comprising:
   reading process procedure code, for reading data out of memory in a predetermined unit;
   dividing process procedure code, for dividing the data into a series of blocks each having a predetermined size;
   detecting process procedure code, for detecting a left-end block and a right-end block, each having significant data, in the series of blocks;
   determining process procedure code, for determining whether or not block compression is effective with respect to a block existing between the detected left-end block and right-end block;
   compressing process procedure code, for performing block compression on the block if it is determined that block compression is effective; and processing process procedure code, for performing processing, other than block compression, on the block and at least a predetermined number of blocks subsequent to the block, if it is determined that block compression is not effective, wherein the determining process procedure code is executed in a predetermined sequence for a plurality of blocks, and the determining process is skipped for at least a predetermined number of blocks subsequent to a block for which it is determined that block compression is not effective.

* * * * *

UNITED STATES PATENT AND TRADEMARK OFFICE
CERTIFICATE OF CORRECTION

PATENT NO.        : 6,658,156 B1
APPLICATION NO. : 09/505729
DATED             : December 2, 2003
INVENTOR(S)       : Masanori Aritomi It is certified that error appears in the above-identified patent and that said Letters Patent is hereby corrected as shown below:

ON TITLE PAGE AT (74) ATTORNEY, AGENT OR FIRM

Insert:   --(74) Attorney, Agent or Firm – Fitzpatrick, Celia, Harper & Scinto--.

COLUMN 1

Line 14, "unit of square blocks each" should read --units of square blocks, each block--;
   Line 43, "data" should read --a data--; and
   Line 45, "unit" should read --units--.

COLUMN 3

Line 64, "unit," should read --units,--; and
   Line 66, "unit" should read --units--.

COLUMN 4

Line 8, "one" should read --one block--; and
   Line 10, "one" should read --one block--.

COLUMN 5

Line 35, "processed" should read --processed by--.

COLUMN 6

Line 21, "skipping" should read --skipped--;
   Line 44, "non compression" should read --non-compression--;
   Line 47, "unit" should read --units--; and
   Line 56, "unit" should read --units--.

COLUMN 7

Line 32, "unit" should read --units--;
   Line 36, "read the block data of the next line." should read --the block data of the next line is read--; and
   Line 41, "when" should read --when a--.

UNITED STATES PATENT AND TRADEMARK OFFICE
CERTIFICATE OF CORRECTION

PATENT NO. : 6,658,156 B1
APPLICATION NO. : 09/503729
DATED : December 2, 2003
INVENTOR(S) : Masanori Aritomi It is certified that error appears in the above-identified patent and that said Letters Patent is hereby corrected as shown below:

COLUMN 8

Line 3, "unit of block line" should read --units of block lines--; and
      Line 56, "non compression" should read --non-compression--.

COLUMN 9

Line 7, "of" should read --of an--; and
      Line 56, "besides" should read --besides the fact that--.

COLUMN 10

Line 3, "CPU" should read --a CPU--.

COLUMN 12

Line 20, "claim 19," should read --claim 20,--.

Signed and Sealed this

Twenty-fourth Day of July, 2007

JON W. DUDAS
*Director of the United States Patent and Trademark Office*